United States Patent Office 3,325,511
Patented June 13, 1967

3,325,511
PHTHALOCYANINE DYESTUFFS
Thomas E. Lesslie, Mount Holly, and Wilson J. Bryan, Jr., Charlotte, N.C., assignors to Martin-Marietta Corporation, a corporation of Maryland
No Drawing. Filed June 8, 1964, Ser. No. 373,567
2 Claims. (Cl. 260—314.5)

The present invention relates to phthalocyanine dyestuffs and to the method for making same.

The phthalocyanine dyestuffs of the present invention may be represented by the formula

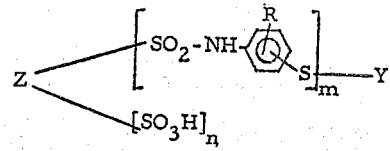

wherein Z is the radical of a phthalocyanine; Y is a member selected from the group consisting of $$-H_m, (-SO_3Na)_m, (-SO_3K)_m$$

and

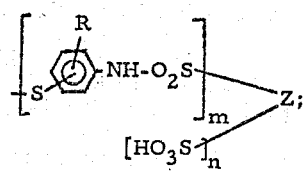

R is a member selected from the group consisting of hydrogen, halogen, alkoxy and alkyl; $m$ is a number from 2–3.5; $n$ is a number from 0.5–1; and the sum of $m+n$ is from 2.5 to 4.

The dyestuffs of the above formula may be synthesized by a process comprising the step of condensing a molecular proportion of

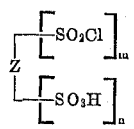

with $m/x$ molecular proportions of a compound of the formula

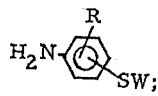

wherein W is a member selected from the group consisting of —SO$_3$Na, —SO$_3$K and

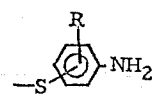

Z, R, $m$, $n$, and $m+n$ are as above defined; and $x$ is the number of amino groups per molecule of

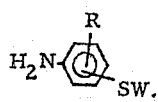

Pyridine or picolines may be used advantageously to catalyze the above condensation.

The dyestuff of the present invention may be produced in Bunte salt form (—SSO$_3$Na or —SSO$_3$K), or mercapto form (—SH), or disulfide form (—S—S—).

In the Bunte salt form, the dyes of the present invention have the formula

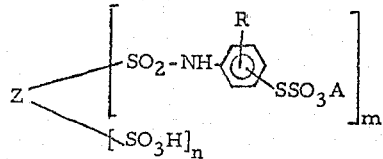

and they may be synthesized by condensing a molecular proportion of

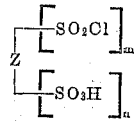

with $m$ molecular proportions of

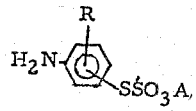

wherein Z, R, $m$, $n$, and $m+n$ are as above defined, and A is a member selected from the group consisting of Na and K. The Bunte salt form of the dyes may be isolated by evaporating to dryness the Bunte salt solutions resulting from the condensation step. In preparing the Na Bunte salt, the condensation will be conducted in the presence of a sodium base, and preparing the K Bunte salt, the condensation will be conducted in the presence of a potassium base.

In the mercapto form, the dyes of the present invention have the formula

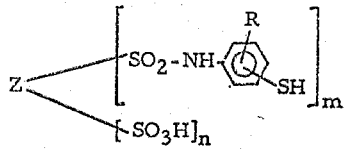

and they may be synthesized by hydrolyzing the above Bunte salt form with acid.

In the disulfide form, the dyes of the present invention have the formula

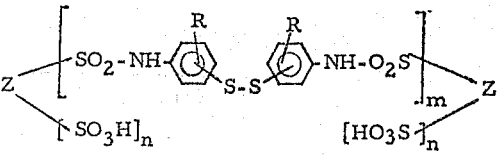

and they may be synthesized by condensing a molecular proportion of

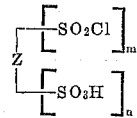

with $m/x$ molecular proportions of

wherein Z, R, $m$, $n$, $m+n$, and $x$ are as above defined.

The dyestuffs of the present invention are particularly suitable for coloring a number of textile materials, such as cotton and regenerated cellulose, without limitation thereto.

The dyestuffs of the present invention have a number of advantages, some of which follow.

The dyestuffs of the present invention are particularly charcterized in the presence of the above sulfonic acid group. When the sulfonic acid groups are present in the magnitude above described, the sulfonic acid contributes to solubility and assists in diffusion of the dye into the fibers, without impairing wash fastness. Moreover, the sulfonic acid brightens the dyestuff and contributes blueness to it; this is an especially important characteristic for phthalocyanine dyes.

The following are specific and non-limiting examples of methods embodying the present invention. All parts in these examples are by weight unless otherwise specified. In all of the following examples, CuPc represents the radical of copper phthalocyanine; CoPc represents the radical of cobalt phthalocyanine; NiPc represents the radical of nickel phthalocyanine; and Pc represents the radical of phthalocyanine.

*Example 1*

The turquoise dyestuff of the formula

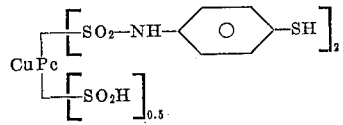

may be prepared as follows.

81.3 parts of

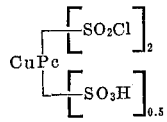

are slurried with ice and water at 0° C. to 1,000 parts, and adjusted to pH 5.5–6.0 by adding 20% aqueous $Na_2CO_3$; 50.0 parts sodium S-4-aminophenylthiosulfate and 6.7 parts of pyridine catalyst are added thereto; the resulting mass is stirred for 2–3 hours at 0° C. while pH 7.0 is maintained by adding 20% aqueous $Na_2CO_3$ as needed, and when pH 7.0 is maintained at 0° C. without further addition of $Na_2CO_3$, the mass is brought to room temperature during 2–4 hours, and stirred for an additional 10 hours at room temperature with addition of $Na_2CO_3$ as needed to maintain pH 7.0, thereby permitting condensation.

At this stage the dyestuff exists as a solution of the Bunte salt, and if desired, this solution may be evaporated to dryness and isolated as

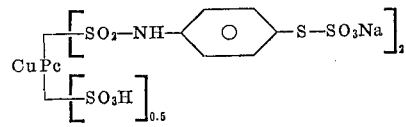

(The corresponding potassium Bunte salt may be prepared by substituting an equimolar amount of potassium S-4-aminophenylthiosulfate for the sodium S-4-aminophenylthiosulfate, and KOH or $K_2CO_3$ for the $Na_2CO_3$ in the above.)

The above mercapto (—SH) form of the dyestuff may be prepared by hydrolyzing the above solution of the Bunte salt with an acid, such as by adding to the above solution of the Bunte salt enough $H_2SO_4$ to bring the acid concentration to 7%, heating to reflux during 2–3 hours, and maintaining reflux 10–12 hours. The mercapto form of the dyestuff is isolated by cooling the resulting mass to 50° C., filtering, collecting the resulting solids, washing the solids acid free with warm water, and optionally drying the solids or preserving in the moist condition for subsequent use in preparation of a printing paste.

In the examples given in the following table the procedure is the same as that given in Example 1, and the examples in the table indicate that a molecular proportion of the phthalocyanine in the second column is reacted with two molecular proportions of the thiosulfate in the third column to produce the dye shown by structural formula in the fourth column, having the color shown in the fifth column.

*Examples 2–4*

| Ex. No. | Phthalocyanine | Thiosulfate | Dye | Color |
|---|---|---|---|---|
| 2 | CoPc[SO₂Cl]₂[SO₃H]₀.₅ | Sodium-S-(3-amino-5-chlorophenyl)thiosulfate. | CoPc[SO₂—NH—⟨○⟩(SH)(Cl)]₂[SO₃H]₀.₅ | Greenish blue. |
| 3 | NiPc[SO₂Cl]₂[SO₃H]₀.₅ | Potassium S-(2-amino-5-methoxyphenyl)thiosulfate. | NiPc[SO₂—NH—⟨○⟩(SH)(OCH₃)]₂[SO₃H]₀.₅ | Bluish green. |
| 4 | Pc[SO₂Cl]₂[SO₃H]₀.₅ | Sodium S-(4-amino-2-methylphenyl(thiosulfate. | Pc[SO₂—NH—⟨○⟩(CH₃)—SH]₂[SO₃H]₀.₅ | Turquoise. |

Example 5

The turquoise blue dyestuff of the formula

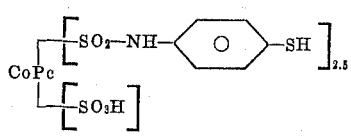

may be prepared as follows.

This example is the same as Example 1 above, except that 89.8 parts

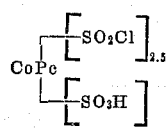

are substituted for the

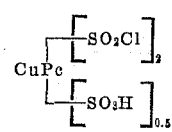

in Example 1, and except that the amount of sodium S-4-aminophenylthiosulfate is increased to 62.5 parts.

Examples 6–8

In the examples given in the following table, the procedure is the same as that given in Example 5, and the examples in the table indicate that a molecular proportion of the phthalocyanine in the second column is reacted with 2.5 molecular proportions of the thiosulfate in the third column to produce the dye shown in the fourth column, having the color shown in the fifth column.

Example 9

The bluish green dyestuff of the formula

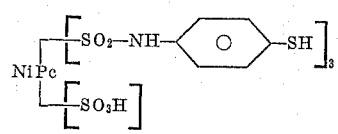

may be prepared as follows.

This example is the same as Example 1, except that 94.7 parts

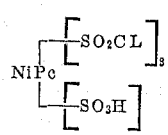

are substituted for the

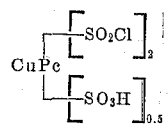

in Example 1, and except that the amount of sodium S-4-aminophenylthiosulfate is increased to 75.0 parts.

Examples 10–12

In the examples given in the following table, the procedure is the same as that given in Example 9, and the examples in the table indicate that a molecular proportion of the phthalocyanine in the second column is reacted with 3 molecular proportions of the thiosulfate in the third column to produce the dye shown in the fourth column, having the color shown in the fifth column.

| Ex. No. | Phthalocyanine | Thiosulfate | Dye | Color |
|---|---|---|---|---|
| 6 | NiPc[SO₂Cl]₂.₅[SO₃H] | Sodium S-(3-amino-4-bromophenyl)thiosulfate. | NiPc[SO₂—NH—⌬(SH)(Br)]₂.₅[SO₃H] | Bluish green. |
| 7 | Pc[SO₂Cl]₂.₅[SO₃H] | Potassium S-(2-amino-5-ethoxyphenyl)thiosulfate. | Pc[SO₂—NH—⌬(SH)(OCH₂CH₃)]₂.₅[SO₃H] | Turquoise. |
| 8 | CuPc[SO₂Cl]₂.₅[SO₃H] | Sodium S-(4-amino-3-ethylphenyl)thiosulfate. | CuPc[SO₂—NH—⌬(CH₂—CH₃)(SH)]₂.₅[SO₃H] | Turquoise. |

| Ex. No. | Phthalocyanine | Thiosulfate | Dye | Color |
|---|---|---|---|---|
| 10 | Pc[−SO₂Cl]₃[−SO₃H] | Sodium S-(3-amino-5-fluorophenyl) thiosulfate. | Pc[−SO₂−NH−C₆H₃(SH)(F)]₃[−SO₃H] | Turquoise. |
| 11 | CuPc[−SO₂Cl]₃[−SO₃H] | Potassium S-(2-amino-5-methoxyphenyl) thiosulfate. | CuPc[−SO₂−NH−C₆H₃(SH)(OCH₃)]₃[−SO₃H] | Turquoise. |
| 12 | CoPc[−SO₂Cl]₃[−SO₃H] | Sodium S-(4-amino-2-methylphenyl) thiosulfate. | CoPc[−SO₂−NH−C₆H₃(CH₃)(SH)]₃[−SO₃H] | Turquoise blue. |

*Example 13*

The greenish turquoise dyestuff of the formula

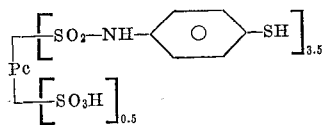

may be prepared as follows.

This example is the same as Example 1 above, except that 89.9 parts

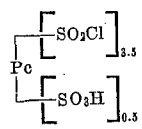

are substituted for the

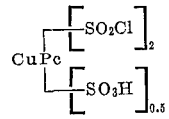

in Example 1, and except that the amount of sodium S-4-aminophenylthiosulfate is increased to 87.5 parts.

*Examples 14–16*

In the examples given in the following table, the procedure is the same as that given in Example 13, and the examples in the table indicate that a molecular proportion of the phthalocyanine in the second column is reacted with 3.5 molecular proportions of the thiosulfate in the third column to produce the dye shown in the fourth column, having the shade given in the fifth column.

| Ex. No. | Phthalocyanine | Thiosulfate | Dye | Color |
|---|---|---|---|---|
| 14 | CuPc[−SO₂Cl]₃.₅[−SO₃H]₀.₅ | Potassium S-(3-amino-5-chlorophenyl) thiosulfate. | CuPc[−SO₂−NH−C₆H₃(SH)(Cl)]₃.₅[−SO₃H]₀.₅ | Turquoise. |
| 15 | CoPc[−SO₂Cl]₃.₅[−SO₃H]₀.₅ | Sodium S-(2-amino-5-ethoxy-phenyl) thiosulfate. | CoPc[−SO₂−NH−C₆H₃(SH)(OCH₂CH₃)]₃.₅[−SO₃H]₀.₅ | Turquoise blue. |
| 16 | NiPc[−SO₂Cl]₃.₅[−SO₃H]₀.₅ | Sodium S-(4-amino-2-ethyl-phenyl) thiosulfate. | NiPc[−SO₂−NH−C₆H₃(CH₃−CH₂)(SH)]₃.₅[−SO₃H]₀.₅ | Bluish green. |

Example 17

The turquoise blue dyestuff of the formula

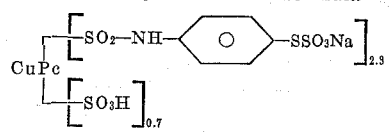

may be prepared as follows.

58.7 parts of 98.1% copper phthalocyanine are added evenly during 1 hour to 379 parts chlorosulfonic acid being stirred at 20–40° C.; the temperature is raised during a period of one hour to 135° C. and then maintained at 135–140° C. for three additional hours, cooled to 85° C. during 30 minutes; held at 80–85° C. for one hour while 49.3 parts 98% thionyl chloride are added thereto; stirred three additional hours at 80–85° C.; and cooled to room temperature. The mass is drowned in ice water at 0° C., causing precipitation; the precipitate is filtered at 0° C., and washed acid free with water at 0° C.

The dyestuff is isolated by cooling the mass to 50° C., to 840 parts; adjusted to pH 5.5–6.0 by adding 20% aqueous $Na_2CO_3$; 63.6 parts sodium S-4-aminophenylthiosulfate and 6.7 parts pyridine catalyst are added thereto. The resulting mass is stirred three hours at 0° C. while pH 7.0 is maintained by adding 20% $Na_2CO_3$ as needed. The mass is then warmed evenly during four hours to room temperature, and stirred 16 hours at room temperature, whereupon the dye is in the form of a solution of its thiosulfuric acid salt.

The thiosulfuric acid salt form of the dye is isolated as a dry powder by evaporating the condensation mass solution to dryness.

Example 18

The turquoise blue dyestuff of the formula

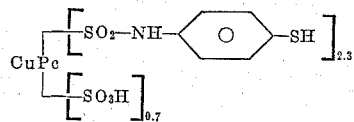

wherein CuPc is the radical of copper phthalocyanine may be prepared as follows.

This example is the same as Example 17 above, except that instead of evaporating the thiosulfuric acid salt solution to dryness to it are added enough hydrochloric acid to adjust the acid concentration to 12%, and thereafter the mass is heated evenly to reflux during one hour, and reflux is maintained for 6 hours, thereby converting the dye to the mercapto form.

The dyestuff is isolated by cooling the mass to 50° C., filtering, collecting the solids, washing the solids acid free with warm water, and optionally drying or preserving in the moist condition for subsequent use in preparation of a printing paste.

Example 19

The turquoise blue dyestuff of the formula

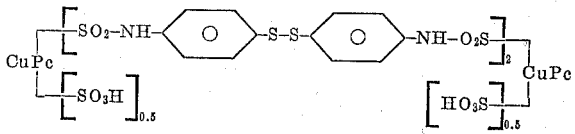

may be prepared as follows.

81.3 parts of

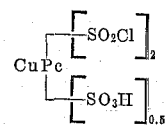

are added to a solution of 37.2 parts 4,4'-diaminodiphenyldisulfide in 800 parts acetone; 50 parts pyridine are added and the mass is stirred at room temperature for 16 hours, thereby permitting condensation.

The dyestuff is isolated by filtering, collecting the solids, washing the solids with acetone and drying.

Examples 20–22

In the examples given in the following table, the procedure is the same as that given in Example 19, and the examples in the table indicate that a molecular proportion of the phthalocyanine in the second column is reacted with a molecular proportion of the disulfide in the third column to produce the dye shown in the fourth column, having the color shown in the fifth column.

| Ex. No. | Phthalocyanine | Disulfide | Dye | Color |
|---|---|---|---|---|
| 20 | CuPc[SO₂Cl]₂[SO₃H]₀.₅ | 3,3'-diamino-5,5'-dichlorodiphenyldisulfide. | CuPc[SO₂—NH—⟨Cl-phenyl⟩—S—S—⟨Cl-phenyl⟩—NH—O₂S]₂CuPc [SO₃H]₀.₅ [HO₃S]₀.₅ | Turquoise. |
| 21 | NiPc[SO₂Cl]₂[SO₃H]₀.₅ | 2,2'-diamino-5,5'-dimethoxydiphenyldisulfide. | NiPc[SO₂—NH—⟨CH₃O-phenyl⟩—S—S—⟨OCH₃-phenyl⟩—NH—O₂S]₂NiPc [SO₃H]₀.₅ [HO₃S]₀.₅ | Bluish green. |
| 22 | Pc[SO₂Cl]₂[SO₃H]₀.₅ | 4,4'-diamino-2,2'-dimethyldiphenyldisulfide. | Pc[SO₂—NH—⟨CH₃-phenyl⟩—S—S—⟨CH₃-phenyl⟩—NH—O₂S]₂Pc [SO₃H]₀.₅ [HO₃S]₀.₅ | Turquoise. |

Example 23

The turquoise blue dyestuff of the formula

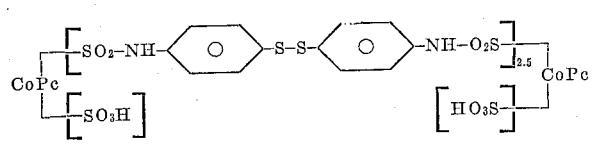

may be prepared as follows.

This example is the same as Example 19 above, except that 89.8 parts of

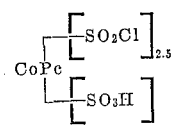

are substituted for the

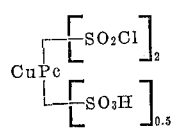

used in Example 19, and except that the amount of 4,4'-diaminodiphenyldisulfide is increased to 46.5 parts.

Examples 24–26

In the examples given in the following table, the procedure is the same as that given in Example 23, and the examples in the table indicate that a molecular proportion of the phthalocyanine in the second column is reacted with 1.25 molecular proportions of the disulfide in the third column to produce the dye shown in the fourth column, having the color shown in the fifth column.

Example 27

The bluish green dyestuff of the formula

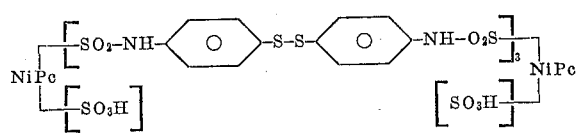

may be prepared as follows.

This example is the same as Example 19 above, except that 94.7 parts of

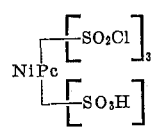

are substituted for the

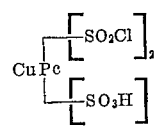

used in Example 19, and except that the amount of 4,4'-diaminodiphenyldisulfide is increased to 55.8 parts.

Examples 28–30

In the examples given in the following table, the procedure is the same as that given in Example 27, and the examples in the table indicate that a molecular proportion of the phthalocyanine in the second column is reacted with 1.5 molecular proportions of the disufide in the third column to produce the dye shown in the fourth column, having the color shown in the fifth column.

| Ex. No. | Phthalocyanine | Disulfide | Dye | Color |
|---|---|---|---|---|
| 24 | NiPc[-SO$_2$Cl]$_{2.5}$ [-SO$_3$H] | 3,3'-diamino-4,4'-dibromodiphenyl-disulfide. | NiPc[-SO$_2$-NH-(Br-Ph)-S-S-(Ph-Br)-NH-O$_2$S-]$_{2.5}$ NiPc [-SO$_3$H] [HO$_3$S-] | Bluish green. |
| 25 | Pc[-SO$_2$Cl]$_{2.5}$ [-SO$_3$H] | 2,2'-diamino-5,5'-diethoxydiphenyl-disulfide. | Pc[-SO$_2$-NH-(Ph-C$_2$H$_5$O)-S-S-(OC$_2$H$_5$-Ph)-NH-O$_2$S-]$_{2.5}$ Pc [-SO$_3$H] [HO$_3$S-] | Turquoise. |
| 26 | CuPc[-SO$_2$Cl]$_{2.5}$ [-SO$_3$H] | 4,4'-diamino-3,3'-diethyldiphenyl-disulfide. | CuPc[-SO$_2$-NH-(CH$_2$-CH$_3$,Ph)-S-S-(Ph,CH$_2$-CH$_3$)-NH-O$_2$S-]$_{2.5}$ CuPc [-SO$_3$H] [HO$_3$S-] | Turquoise. |

| Ex. No. | Phthalocyanine | Disulfide | Dye | Color |
|---|---|---|---|---|
| 28 | Pc[SO₂Cl]₃ [SO₃H] | 3,3'-diamino-5,5'-difluorodiphenyldisulfide. | Pc[SO₂—NH—C₆H₃(F)—S—S—C₆H₃(F)—NH—O₂S]Pc [SO₃H] [HO₃S] | Turquoise. |
| 29 | CuPc[SO₂Cl]₃ [SO₃H] | 2,2'-diamino-5,5'-dimethoxydiphenyldisulfide. | CuPc[SO₂—NH—C₆H₃(OCH₃)—S—S—C₆H₃(OCH₃)—NH—O₂S]₃ CuPc [SO₃H] [HO₃S] | Turquoise. |
| 30 | CoPc[SO₂Cl]₃ [SO₃H] | 4,4'-diamino-2,2'-dimethyldiphenyldisulfide. | CoPc[SO₂—NH—C₆H₃(CH₃)—S—S—C₆H₃(CH₃)—NH—O₂S]CoPc [SO₃H] [HO₃S] | Turquoise blue. |

Example 31

The greenish turquoise dyestuff of the formula

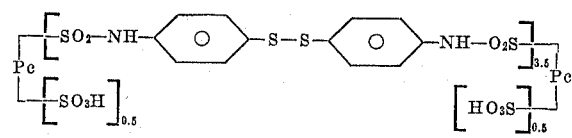

may be prepared as follows.

This example is the same as Example 19 above, except that 89.9 parts of

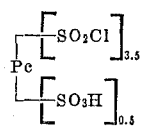

are substituted for the

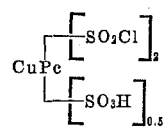

used in Example 19, and except that the amount of 4,4'-diaminodiphenyldisulfide is increased to 65.1 parts.

Examples 32–34

In the examples given in the following table, the procedure is the same as that given in Example 30, and the examples in the table indicate that a molecular proportion of the phthalocyanine in the second column is reacted with 1.75 molecular proportions of the disulfide in the third column to produce the dye shown in the fourth column, having the color shown in the fifth column.

| Ex. No. | Phthalocyanine | Disulfide | Dye | Color |
|---|---|---|---|---|
| 32 | CuPc[—SO₂Cl]₃.₅[—SO₃H]₀.₅ | 3,3′-diamino-5,5′-dichlorodiphenyldisulfide. | CuPc[—SO₂—NH—(Cl-C₆H₃)—S—S—(C₆H₃-Cl)—NH—O₂S—]₃.₅ CuPc [—SO₃H]₀.₅ [HO₃S—]₀.₅ | Turquoise. |
| 33 | CoPc[—SO₂Cl]₃.₅[—SO₃H]₀.₅ | 2,2′-diamino-5,5′-diethoxydiphenyldisulfide. | CoPc[—SO₂—NH—(C₂H₅O-C₆H₃)—S—S—(C₆H₃-OC₂H₅)—NH—O₂S—]₃.₅ CoPc [—SO₃H]₀.₅ [HO₃S—]₀.₅ | Turquoise blue. |
| 34 | NiPc[—SO₂Cl]₃.₅[—SO₃H]₀.₅ | 4,4′-diamino-2,2′-diethyldiphenyldisulfide. | NiPc[—SO₂—NH—(CH₃CH₂-C₆H₃)—S—S—(C₆H₃-CH₂CH₃)—NH—O₂S—]₃.₅ NiPc [—SO₃H]₀.₅ [HO₃S—]₀.₅ | Bluish green. |

All of the dyes of the present invention may be applied to cotton fabric by padding onto the fabric a composition comprising 20 parts dye, 945 parts water, and 35 parts 60% sodium sulfide, squeezing the fabric to 70% wet pick-up based on fabric weight, drying the fabric, steaming the fabric, passing the fabric into a chemical oxidizing bath comprising 985 parts water, 7.5 parts sodium dichromate, and 7.5 parts glacial acetic acid, scouring and drying the fabric.

The thiosulfuric acid salt forms of the dyes of the present invention may be applied to cotton fabric by padding onto the fabric a composition comprising 25 parts thiosulfuric acid salt form of the dye, 825 parts water, 50 parts thiourea and 100 parts urea, drying the fabric, passing the fabric for 90 seconds into a curing oven heated to 410° F., and optionally scouring and drying the fabric.

What is claimed is:

1. A dyestuff of the formula

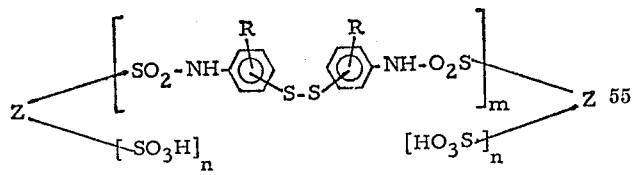

wherein Z is the radical of the phthalocyanine selected from the group consisting of copper phthalocyanine, cobalt phthalocyanine, nickel phthalocyanine and phthalocyanine; R is a member selected from the group consisting of hydrogen, halogen, alkoxy having one or two C atoms, and alkyl having one or two C atoms; $m$ is a number from 2–3.5; $n$ is a number from 0.5–1; and the sum of $m+n$ is from 2.5–4.

2. The dyestuff of the formula

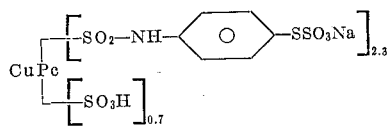

wherein CuPc is the radical of copper phthalocyanine.

References Cited

UNITED STATES PATENTS 3,226,395  12/1965  Schimmelschmidt et al. 260—314.5
3,236,860  2/1966  Schultheis et al. ____ 260—314.5

OTHER REFERENCES

Belg. Chemical Abstracts, vol. 57 (1962) page 16809e.

WALTER A. MODANCE, *Primary Examiner.*

JAMES A. PATTEN, *Assistant Examiner.*